United States Patent [19]

Parker et al.

[11] 3,713,397
[45] Jan. 30, 1973

[54] MOTORIZED RAILWAY TRUCK

[75] Inventors: John Henry Parker, St. Laurent, Quebec; Frank Thomas McInerney, Bruno, Quebec, both of Canada

[73] Assignee: MLW-Worthington Limited, Montreal, Quebec, Canada

[22] Filed: Jan. 11, 1971

[21] Appl. No.: 105,284

[52] U.S. Cl. ............105/136, 105/182 R, 105/199 R
[51] Int. Cl. ............B61c 9/50, B61f 3/04, B61f 5/20
[58] Field of Search .......105/182 R, 183, 199 R, 136

[56] References Cited

UNITED STATES PATENTS

| 3,403,638 | 10/1968 | Hirst | 105/199 R |
| 2,704,518 | 3/1955 | DeBuzareinques | 105/199 R |
| 2,089,110 | 8/1937 | Bugatti | 105/183 |

FOREIGN PATENTS OR APPLICATIONS

| 839,336 | 6/1960 | Great Britain | 105/199 R |

Primary Examiner—Gerald M. Forlenza
Assistant Examiner—Howard Beltran
Attorney—Alan Swabey

[57] ABSTRACT

A truck assembly adapted to maintain substantially equal loading on the motorized axles of a two axle truck by resiliently suspending said truck on a central post, the resilient suspension permitting rotation of the truck about a horizontal axis located approximately at ground level and in line with the vertical axis of rotation of the truck from about the post.

7 Claims, 7 Drawing Figures

INVENTORS
John Henry PARKER
Frank Thomas McINERNEY

*Alan Swabey*

ATTORNEY

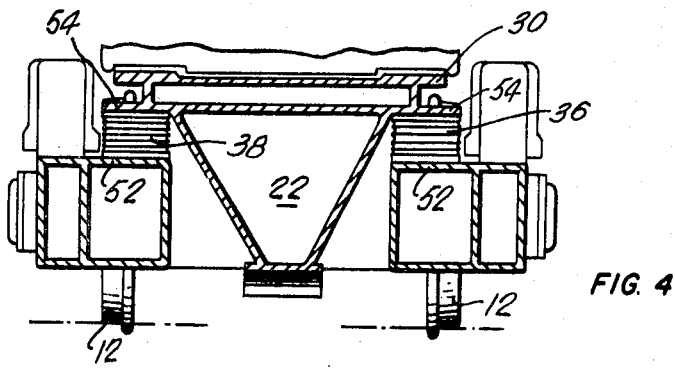
FIG. 4
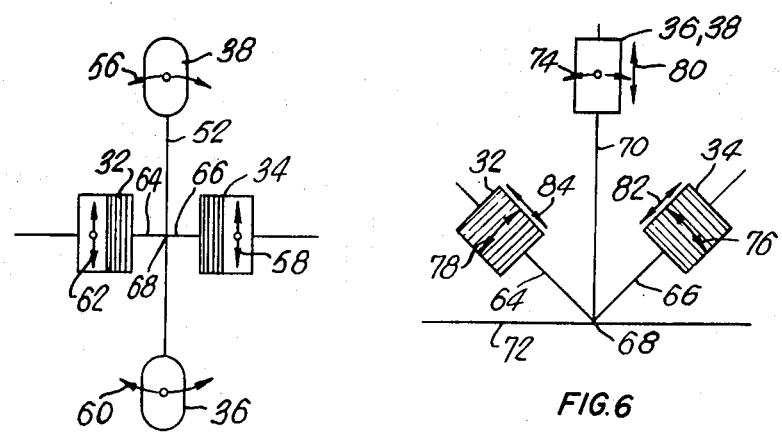
FIG. 5
FIG. 6
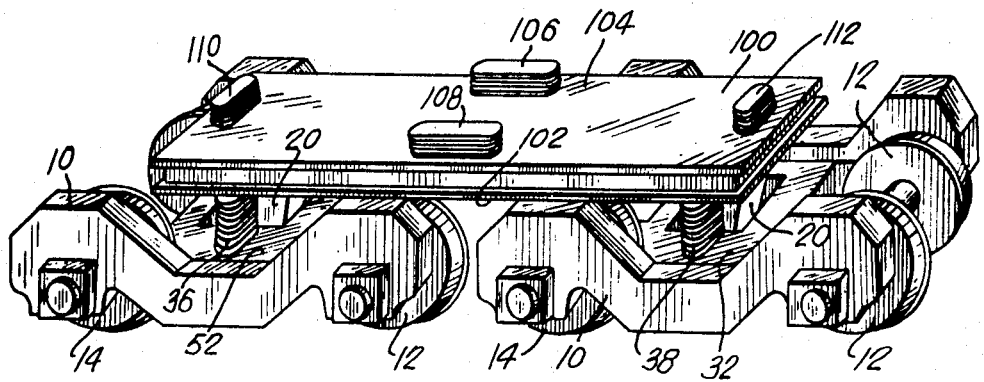
FIG. 7
INVENTORS
John Henry PARKER
Frank Thomas McINERNEY
*Alan Sinsky*
ATTORNEY

MOTORIZED RAILWAY TRUCK

BACKGROUND OF THE INVENTION

1. Field of the Invention

The present invention relates to a locomotive truck. More particularly, the present invention relates to a suspension system for a two-axle truck with two, axle hung, nose suspended traction motors wherein the load is maintained evenly on both axles during acceleration or decceleration of the locomotive, by the aforementioned motors.

2. Description of the Prior Art

Truck suspensions wherein the truck is fixed to the vehicle chassis by means of resilient pads and the use of resilient pads as spring members are well known. Normally, when the resilient pad is utilized as the suspension member between the truck and the car body, they are positioned directly between an upper surface of the truck and the bottom surface of the car or locomotive and are located generally in the diagonally opposed corners of the truck. This, while providing stability between the truck and the car, severely limits any tendency to equalize the load on the front and rear wheels of the truck during acceleration and decceleration.

SUMMARY OF INVENTION

It is thus the main object of the present invention to provide a suspension system facilitating balancing of the loading on the wheels during the application of tractive or braking effort by the aforementioned motors.

More particularly, it is the main object of the present invention to provide a suspension system for a two-axle truck, the suspension system being adapted to facilitate the equalization of loading on the drive wheels during acceleration or decceleration to thereby improve the overall traction of the locomotive.

With the arrangement of the present invention, a self-contained unit that may be simply fixed to the bottom of the vehicle is provided. This unit has a central mounting post resiliently attached to the truck frame by pairs of resilient members applying forces in opposite directions to the truck frame and the center post structure.

Broadly, the present invention relates to a truck assembly comprising a truck frame having a pair of motorized axles with the motors being mounted on bearings on each end of the axle and additionally supported on the truck frame. A vertical post structure is disposed at the center of the truck frame and has a lower bearing section adjacent its free end. The lower bearing section is provided with bearing means interposed on opposite sides and at an angle to the central vertical axis of the post and lying in the central vertical plane perpendicular to the truck axles. An upper bearing section is provided adjacent a mounting end of the post structure for supporting a vehicle body. Further bearing means are interposed between the truck frame and the upper bearing section. The bearing means at the top and bottom of the post structure are provided to permit limited angular motion about a horizontal transverse axis parallel to and midway between the axles of the truck to compensate for motor forces on the truck frame and for accommodating limited angular motion about the central vertical axis of the post.

BRIEF DESCRIPTION OF DRAWINGS

Further features, objects and advantages of the present invention will be evident from the following detailed description taken in conjunction with the accompanying drawings in which:

FIG. 4 is a section along the line 4—4 of FIG. 1;

FIGS. 5 and 6 are schematic illustrations of the suspension arrangement of the present invention; and FIG. 7 is a further arrangement of a bolster coupling a pair of trucks, each of which incorporates the mounting of the present invention.

DESCRIPTION OF PREFERRED EMBODIMENTS

Figure 1:
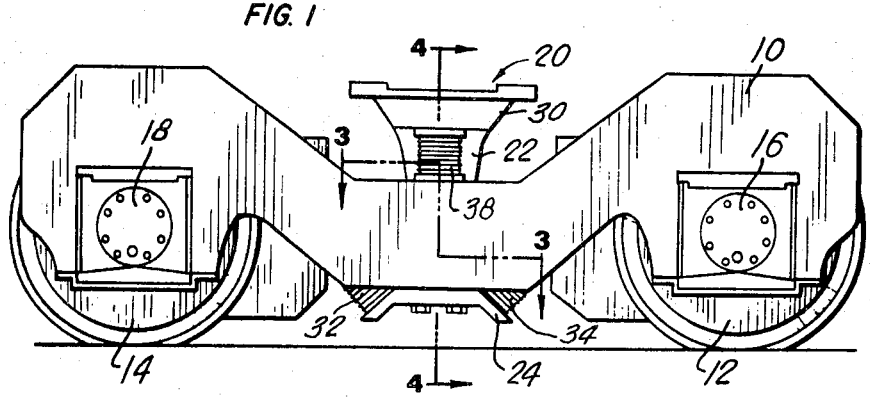
FIG. 1 is a side elevation view of the truck suspension structure of the present invention.

As shown in FIG. 1, the truck frame 10 mounts pairs of wheels 12 and 14 on axles 16 and 18 at opposite ends of the truck. The center post assembly or structure 20 adapted to be fixed to the bottom of the car or locomotive is provided with a center post 22, a lower bearing section 24 adjacent the free end 28 of the post, and an upper bearing section 30 positioned adjacent the mounting end of the post assembly.

Figure 2:
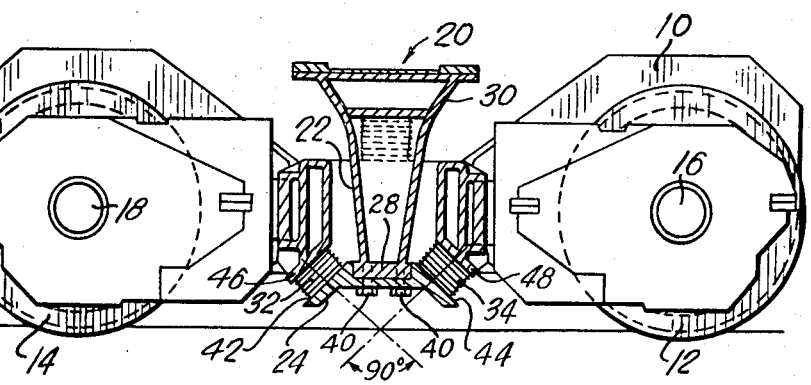
FIG. 2 is a longitudinal section through the truck structure of the present invention.

These main elements, the frame 10 and post structure 20, are interconnected by suitable bearing means such as resilient members which in the illustrated embodiment take the form of resilient pads to be described in more detail hereinbelow. In the illustrated arrangement, there are two pairs of pads formed by individual resilient pad means 32, 34 and 36, 38 respectively (see FIGS. 2 and 3).

The bottom bearing structure 24 in the illustrated arrangement is secured to the bottom end of the post 22 by bolts 40 or other suitable means and is provided with a pair of bearing surfaces 42 and 44 on opposite sides of the post 22.

The frame 10 is provided with a pair of bearing surfaces 46 and 48 opposed respectively to the bearing surfaces 42 and 44 of the structure 24.

The slope of these surfaces 42, 44, 46 and 48 to the horizontal in the illustrated arrangement has been shown to be about 45° and the resilient means 32 and 34 which have their longitudinal axes (illustrated at 64 and 66 in FIG. 6) substantially perpendicular to these surfaces thus intersect an an angle of approximately 90°. The point of intersection of these longitudinal axes 64 and 66 is important to the present invention and will be described in more detail hereinbelow with respect to FIGS. 5 and 6.

Figure 3:
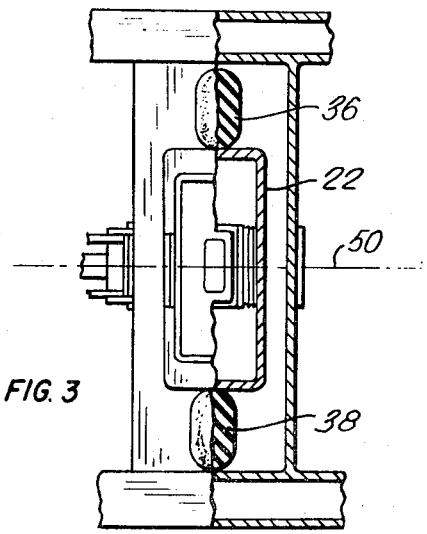
FIG. 3 is a section along the line 3—3 of FIG. 1.

It will be noted that the resilient means 32 and 34 are located symmetrically with respect to the longitudinal center line 50 of the truck 10 (see FIGS. 3 and 5). Only a single pair of resilient pads 32 and 34 have been shown, however, a plurality of pairs of pads may be used if desired. When a plurality of pairs of pads are used, these also should be symmetrically arranged with respect to the longitudinal center line 50 and should not project laterally of this center line as far as the resilient members 36 and 38. Preferably, the resilient pads 32 and 34 should project a minimum distance on opposite sides of the longitudinal center line 50 of the truck. When a single pair of pads 32 and 34 are used, the longitudinal axis of the pads 32 and 34 and the rotation axis 70 of the truck intersect at a point 68 (see FIGS. 5 and 6).

The resilient pads 36 and 38 are arranged to bear on upper surface 52 of the truck and a bearing surfaces 54 on the upper support section 30 of the post structure 20 (see FIG. 4).

The resilient pad means 32, 34, 36 and 38 are compressed when the vehicle chassis is in place; the pads 36 and 38 are compressed by the weight of the vehicle and additionally by precompression in pads 32 and 34, which is provided by proper dimensional control of the assembly, as the bottom bearing structure 24 is drawn up to post 20 by bolts 40. Pads 32 and 34 are precompressed without the locomotive exerting tractive efforts, so that when tractive effort is applied to pad 32 by surface 46 and thus onto the surface 42 causing pad 32 to compress further, pad 34 does not experience a tension force as surfaces 44 and 48 move apart. The necessary increase in length of pad 34 is due entirely to relaxation of prior precompression. The precompression required must also be sufficient to prevent the corners of pads 32 and 34 from experiencing tension as the truck turns about the vertical axis 70 during negotiation of the minimum curve.

Compression of the pads in the principal direction changes their characteristics in the orthogonal directions; thus compression in excess of the minimum may be used to achieve desired lateral characteristics for proper ride control.

The members 32, 34, 36 and 38 are arranged in an X-formation in plan view (see FIG. 5). The members 32 and 34 are on the longitudinal axis of the truck and are spaced as required from physical size considerations so that their principal axes intersect at rail level, and the resilient pads 36 and 38 are on the transverse axes 52 of the truck and are spaced laterally wide enough to provide lateral stability of the chassis, but with due consideration for the shear displacement as the truck pivots through a given angle (see FIG. 5).

The cross-sectional shape of the members 32, 34, 36 and 38 is not of prime consideration. However, it is preferred to have the major lateral axes of the members 36 and 38 extend substantially parallel to the transverse axis 52 of the truck. This facilitates turning of the truck relative to the post structure 20 about line 52 through point 68 and thus relative to the car being supported so that the wheels 12 and 14 can follow the rails more easily. The pads 32 and 34 are preferably wider in the transverse direction of the truck than in the longitudinal direction thereof, thereby to offer less resistance to rotation about point 68 during load equalization as will be described in more detail hereinbelow.

As previously indicated, one of the main features of the present invention is to prevent or minimize transfer of the load from one pair of wheels 12 to the other pair of wheels 14 or vice versa during motoring or dynamic braking. This is accomplished through the resilient members 32, 34, 36 and 38 as will be more apparent from FIG. 6. The two resilient elements 32 and 34 have their longitudinal axes 64 and 66 projecting to meet at a point 68. Also, the vertical axis 70 along the transverse axis 52 and containing the longitudinal axes of the resilient members 36 and 38 also passes through the point 68. This point 68 preferably is located at the same elevation as the track as indicated by the line 72 in FIG. 6. However, it may be spaced slightly above or below this line and generally in design, will be positioned, with new wheels above the rail, a distance equal to half of the expected wear in the radius of the wheels. Thus, with worn wheels, the point will be one half the radial wear below the rail surface.

The point 68 being the point of intersection of the principal axes 64 and 66 of the resilient members 32 and 34 in the illustrated arrangement also falls directly on the longitudinal axis 50 of the truck and will be located on the vertical turning axis 70 of the truck, i.e., the longitudinal axis of the post structure 20 (see FIGS. 5 and 6).

The point 68 thus is located on the vertical axis 70 of rotation of the truck during turning of the truck relative to the car and is also on the pivotal axis of the truck relative to the post 20 during tilting of the truck to maintain the loading substantially uniform on the wheels during acceleration and deceleration. Thus, the truck rotates about the vertical and horizontal axes through the point 68 by distorting the resilient pads 32, 34, 36 and 38 as indicated by the arrows 56, 58, 60 and 62 and the arrows 74, 76 and 78 respectively.

As can be seen from the above, the resilient elements 32, 34, 36 and 38 must be of a specific type to permit the relative movement as designated by the arrows 56, 58, 60 and 62 and the arrows 74, 76 and 78 while providing a resilient support in the direction of the longitudinal axes of each of the support members 32, 34, 36 and 38 as indicated by the arrows 80, 82 and 84 (see FIG. 6). One suitable type of resilient member comprises a laminate of rigid plates interposed by resilient pads. These resilient pads have their greatest resistance to compression in the direction perpendicular to the faces thereof, i.e. in a direction parallel to the longitudinal axes of the resilient members, more specifically in the direction of the arrows 80, 82 and 84 of FIG. 6. The characteristics of the rubber or resilient pads can be controlled to provide the required degree of resistance in the directions of the arrows 56, 58, 60 and 62 and of the arrows 74, 76 and 78 while providing the resilient suspension and relative movement between the truck and the car as indicated by the arrows 80, 82 and 84. By correlating the dimensions of the pads together with their compositions, and compression when installed, mentioned previously, one can obtain the desired degree of resistance to movement in all of the directions above indicated.

In the above description, the post structures 20 were adapted to be connected directly to the car. It is also possible to place a pair of trucks in tanden arrangement on a bolster as indicated at 100 in FIG. 7. This bolster includes the top plate 104 rigidly interconnecting a pair of posts 20. The pads or resilient members 36 and 38 are compressed between the upper surfaces 52 of the trucks 10 and the bottom surface 102 of the main bolster plate 104.

The bolster 100 itself may be secured to the car by means of resilient elements arranged in pairs as indicated at 106, 108, 110 and 112. These pads or resilient elements have similar characteristics to the pads 36 and 38 and permit relative movement vertically and horizontally so that the car is resiliently supported on the bolster and the bolster has a degree of freedom permitting rotation about a vertical axis.

It will be evident to those skilled in the art from the above that the basic arrangement of the present invention prevents load transfer by pivoting about a horizontal axis positioned approximately at track level in exactly the amount required to compensate for motor forces through the resilience of the pads 32, 34, 36 and 38 while also permitting turning movement of the truck frame relative to the car body about a vertical axes and providing sufficient resilience to prevent transmission of shock from the wheels through to the car being supported.

When the bolster structure illustrated in FIG. 7 is utilized, all the advantages of the basic structure are retained, however, the further advantages in that resilient support of the car body can be improved and further turning about a vertical axis is permitted.

While the description has been directed to locomotive or railway car suspension, it will be apparent that the invention may also be applied to other vehicles such as for example highway vehicles.

Modifications will be evident to those skilled in the art without departing from the spirit of the invention as described hereinabove and specifically defined in the appended claims.

We claim:

1. A truck assembly comprising a truck frame having a pair of motorized axles and wherein motors are mounted on bearings on each axle and additionally supported on said truck frame a vertical post structure disposed at the center of said truck frame and having a lower bearing section adjacent a free end of said post structure, said lower bearing section having bearing means interposed on opposite sides and at an angle to the central vertical axis of said post and lying in the central vertical axis of said post and lying in the central vertical plane perpendicular to said truck axles, an upper bearing section adjacent a mounting end of said post structure for supporting a vehicle body, further bearing means interposed between said truck frame and said upper bearing section, said bearing means and further bearing means permitting limited angular motion about a horizontal transverse axis parallel to and midway between said axles to compensate for motor forces on said truck frame and for accommodating limited angular motion about said central vertical axis of said post.

2. A truck assembly as defined in claim 1 wherein said bearing means are resilient pads consisting of layers of rubber and metal laminated together.

3. A truck assembly as defined in claim 2 wherein said longitudinal axes of said resilient members intersect at substantially 90°.

4. A truck assembly as defined in claim 3 wherein said further resilient means comprises a pair of resilient members positioned one on each side of said post structure adjacent lateral sides of said truck frame.

5. A truck assembly as defined in claim 4 wherein said further resilient members have their longitudinal axes in a vertical plane passing through said vertical turning axis of said truck frame about said post structure.

6. A truck assembly as defined in claim 2 wherein said resilient members and said further resilient members in plan view are arranged on an X-configuration with the resilient members being aligned on the longitudinal axes of said truck and a further resilient member being aligned on a transverse axis of said truck.

7. A truck assembly as defined in claim 1 wherein said horizontal transverse axis lies substantially on the plane defined by points of rolling contact of wheels and rails.

* * * * *